(12) United States Patent
Millard et al.

(10) Patent No.: US 10,497,958 B2
(45) Date of Patent: Dec. 3, 2019

(54) COORDINATIVELY UNSATURATED TITANIUM CATECHOLATE COMPLEXES AND PROCESSES ASSOCIATED THEREWITH

(71) Applicant: Lockheed Martin Energy, LLC, Bethesda, MD (US)

(72) Inventors: Matthew Millard, Cambridge, MA (US); Adam Morris-Cohen, Concord, MA (US); Roger Frisbee, Hendersonville, NC (US)

(73) Assignee: Lockheed Martin Energy, LLC, Bethesda, MD (US)

( * ) Notice: Subject to any disclaimer, the term of this patent is extended or adjusted under 35 U.S.C. 154(b) by 337 days.

(21) Appl. No.: 15/379,418

(22) Filed: Dec. 14, 2016

(65) Prior Publication Data

US 2018/0162886 A1 Jun. 14, 2018

(51) Int. Cl.
*H01M 8/08* (2016.01)
*H01M 8/18* (2006.01)

(52) U.S. Cl.
CPC ............. *H01M 8/08* (2013.01); *H01M 8/188* (2013.01); *Y02E 60/528* (2013.01)

(58) Field of Classification Search
CPC ................................ H01M 8/08; H01M 8/188
See application file for complete search history.

(56) References Cited

U.S. PATENT DOCUMENTS 1,279,295 A  9/1918 Downs
1,988,575 A  1/1935 Schmidt
(Continued)

FOREIGN PATENT DOCUMENTS

CN  1284208 A  2/2001
CN  101877412 A  11/2010
(Continued)

OTHER PUBLICATIONS

Ahluwalia et al., Intermediates for Organic Synthesis, Chapter 1, Phenols, Sections 1.21 and 1.23, (2003), I.K. International Pvt. Ltd.
(Continued)

*Primary Examiner* — Jimmy Vo
(74) *Attorney, Agent, or Firm* — BakerHostetler (57) ABSTRACT

Coordinatively saturated titanium (IV) coordination compounds containing catecholate ligands can be desirable active materials for flow batteries and other electrochemical energy storage systems. Such coordination compounds can be formed advantageously via an intermediate composition containing a coordinatively unsaturated titanium (IV) coordination compound. More specifically, such compositions can include a coordinatively unsaturated titanium (IV) coordination compound having a coordination number of 5 or less and containing two catecholate ligands, wherein the composition is substantially free of non-ligated catechol compound. Methods for forming the coordinatively unsaturated titanium (IV) coordination compounds can include: combining titanium tetrachloride and a catechol compound in an aprotic solvent to form a reaction mixture, and reacting the titanium tetrachloride with the catechol compound in an absence of base to form a coordinatively unsaturated titanium (IV) coordination compound having a coordination number of 5 or less and containing two catecholate ligands and that is insoluble in the reaction mixture.

18 Claims, 1 Drawing Sheet

(56) References Cited

U.S. PATENT DOCUMENTS

| | | |
|---|---|---|
| 2,353,782 A | 7/1944 | Neumark |
| 2,415,792 A | 2/1947 | Gravell |
| 3,294,588 A | 12/1966 | Morton |
| 3,425,796 A | 2/1969 | Bauer |
| 3,428,654 A | 2/1969 | Rubinfeld |
| 3,573,984 A | 4/1971 | Shah |
| 3,707,449 A | 12/1972 | Reinhardt et al. |
| 3,772,379 A | 11/1973 | Woodgate |
| 3,801,642 A | 4/1974 | Worrel |
| 3,876,435 A | 4/1975 | Dollman |
| 3,916,004 A | 10/1975 | Okada et al. |
| 3,919,000 A | 11/1975 | Yarrington |
| 3,920,756 A | 11/1975 | Tahara et al. |
| 3,929,506 A | 12/1975 | Leddy et al. |
| 3,985,517 A | 10/1976 | Johnson |
| 3,985,585 A | 10/1976 | Tuttle et al. |
| 4,046,861 A | 9/1977 | Reinhardt et al. |
| 4,064,324 A | 12/1977 | Eustace |
| 4,069,371 A | 1/1978 | Zito |
| 4,126,529 A | 11/1978 | DeBerry |
| 4,180,623 A | 12/1979 | Adams |
| 4,202,799 A | 5/1980 | Yoshimura et al. |
| 4,233,144 A | 11/1980 | Pace et al. |
| 4,362,791 A | 12/1982 | Kaneko et al. |
| 4,378,995 A | 4/1983 | Gratzfeld et al. |
| 4,410,606 A | 10/1983 | Loutfy et al. |
| 4,436,711 A | 3/1984 | Olson |
| 4,436,712 A | 3/1984 | Olson |
| 4,436,713 A | 3/1984 | Olson |
| 4,436,714 A | 3/1984 | Olson |
| 4,443,423 A | 4/1984 | Olson |
| 4,443,424 A | 4/1984 | Olson |
| 4,468,441 A | 8/1984 | D'Agostino et al. |
| 4,485,154 A | 11/1984 | Remick et al. |
| 4,520,083 A | 5/1985 | Prater et al. |
| 4,563,403 A | 1/1986 | Julian |
| 4,592,973 A | 6/1986 | Pemsler et al. |
| 4,617,244 A | 10/1986 | Greene |
| 4,680,308 A | 7/1987 | Schwartz et al. |
| 4,818,646 A | 4/1989 | Takakubo et al. |
| 4,880,758 A | 11/1989 | Heistand, II et al. |
| 4,952,289 A | 8/1990 | Ciccone et al. |
| 4,959,135 A | 9/1990 | Zenner et al. |
| 4,973,720 A | 11/1990 | Saito et al. |
| 5,084,533 A | 1/1992 | Shah et al. |
| 5,102,906 A | 4/1992 | Nakayama et al. |
| 5,122,461 A | 6/1992 | Hsiung et al. |
| 5,264,097 A | 11/1993 | Vaughan |
| 5,302,481 A | 4/1994 | Ong |
| 5,318,865 A | 6/1994 | Kaneko et al. |
| 5,433,934 A | 7/1995 | Chang et al. |
| 5,472,807 A | 12/1995 | Licht et al. |
| 5,643,670 A | 7/1997 | Chung |
| 5,679,239 A | 10/1997 | Blum et al. |
| 5,759,711 A | 6/1998 | Miyabayashi et al. |
| 5,785,841 A | 7/1998 | Tseng |
| 5,876,581 A | 3/1999 | Itaya et al. |
| 5,910,366 A | 6/1999 | Chowdhury et al. |
| 6,001,326 A | 12/1999 | Kim et al. |
| 6,030,517 A | 2/2000 | Lincot et al. |
| 6,054,230 A | 4/2000 | Kato |
| 6,461,772 B1 | 10/2002 | Miyake et al. |
| 6,475,661 B1 | 11/2002 | Pellegri et al. |
| 6,485,868 B1 | 11/2002 | Tsujioka et al. |
| 6,555,989 B1 | 4/2003 | Pearson |
| 6,585,951 B1 | 7/2003 | Hong et al. |
| 6,624,328 B1 | 9/2003 | Guerra |
| 7,046,418 B2 | 5/2006 | Lin et al. |
| 7,193,764 B2 | 3/2007 | Lin et al. |
| 7,223,833 B1 | 5/2007 | Nielsen et al. |
| 7,252,905 B2 | 8/2007 | Clarke et al. |
| 7,265,162 B2 | 9/2007 | Yandrasits et al. |
| 7,348,088 B2 | 3/2008 | Hamrock et al. |
| 7,463,917 B2 | 12/2008 | Martinez |
| 7,508,568 B2 | 3/2009 | Lin et al. |
| 7,550,231 B2 | 6/2009 | Stauffer |
| 7,557,164 B2 | 7/2009 | Felix et al. |
| 7,625,663 B2 | 12/2009 | Clarke et al. |
| 7,645,540 B2 | 1/2010 | Boone et al. |
| 7,678,728 B2 | 3/2010 | Olson et al. |
| 7,745,056 B2 | 6/2010 | Lee et al. |
| 7,767,777 B2 | 8/2010 | Buesing et al. |
| 7,927,731 B2 | 4/2011 | Sahu |
| 7,931,981 B2 | 4/2011 | Boone et al. |
| 7,935,366 B2 | 5/2011 | Pahuja et al. |
| 7,998,335 B2 | 8/2011 | Feeney et al. |
| 8,129,554 B2 | 3/2012 | Schwaiger |
| 8,187,441 B2 | 5/2012 | Evans et al. |
| 8,445,118 B2 | 5/2013 | Cordonier et al. |
| 8,492,581 B2 | 7/2013 | Frost et al. |
| 8,691,413 B2 | 4/2014 | Esswein et al. |
| 8,753,761 B2 | 6/2014 | Esswein et al. |
| 9,300,000 B2 | 3/2016 | Jansen et al. |
| 9,382,274 B2 | 7/2016 | Esswein et al. |
| 9,409,842 B1 | 8/2016 | Fu et al. |
| 2002/0177042 A1 | 11/2002 | Amendola |
| 2003/0068561 A1 | 4/2003 | Okahara et al. |
| 2003/0143456 A1 | 7/2003 | Kazacos et al. |
| 2003/0228394 A1 | 12/2003 | Abdel-Monem et al. |
| 2004/0096746 A1 | 5/2004 | Wietelmann et al. |
| 2005/0098437 A1 | 5/2005 | Shiepe |
| 2005/0244707 A1 | 11/2005 | Skyllas-Kazacos et al. |
| 2006/0047094 A1 | 3/2006 | Cherkasov et al. |
| 2007/0275291 A1 | 11/2007 | Gu et al. |
| 2008/0274385 A1 | 11/2008 | Creeth |
| 2008/0292964 A1 | 11/2008 | Kazacos et al. |
| 2009/0110998 A1 | 4/2009 | Miyachi et al. |
| 2009/0130525 A1 | 5/2009 | Miyachi et al. |
| 2009/0208807 A1 | 8/2009 | Miyachi et al. |
| 2009/0308752 A1 | 12/2009 | Evans et al. |
| 2010/0003586 A1 | 1/2010 | Sahu |
| 2010/0059388 A1 | 3/2010 | Clarke et al. |
| 2010/0086823 A1 | 4/2010 | Koshino et al. |
| 2010/0086983 A1 | 4/2010 | Gellett et al. |
| 2010/0239946 A1 | 9/2010 | Miyachi et al. |
| 2011/0014532 A1 | 1/2011 | Knuckey et al. |
| 2011/0136016 A1 | 6/2011 | Huang et al. |
| 2011/0189549 A1 | 8/2011 | Sun et al. |
| 2011/0195283 A1 | 8/2011 | Sun et al. |
| 2011/0200890 A1 | 8/2011 | Kocherginsky |
| 2011/0223450 A1 | 9/2011 | Horne et al. |
| 2011/0244277 A1 | 10/2011 | Gordon, II et al. |
| 2011/0244367 A1 | 10/2011 | Watahiki et al. |
| 2012/0052347 A1 | 3/2012 | Wilson et al. |
| 2012/0077095 A1 | 3/2012 | Roumi et al. |
| 2012/0107661 A1 | 5/2012 | Lee et al. |
| 2012/0135278 A1 | 5/2012 | Yoshie et al. |
| 2012/0171541 A1 | 7/2012 | Park et al. |
| 2012/0183868 A1 | 7/2012 | Toussaint et al. |
| 2012/0196188 A1 | 8/2012 | Zhang et al. |
| 2012/0202099 A1 | 8/2012 | Perry et al. |
| 2012/0208061 A1 | 8/2012 | Sahu et al. |
| 2012/0244406 A1 | 9/2012 | Xia et al. |
| 2012/0263990 A1 | 10/2012 | Kim |
| 2013/0004819 A1 | 1/2013 | Mun et al. |
| 2013/0157087 A1 | 6/2013 | Pandy et al. |
| 2013/0252062 A1 | 9/2013 | Wilkins et al. |
| 2013/0252137 A1 | 9/2013 | Zhang et al. |
| 2014/0028260 A1 | 1/2014 | Goeltz et al. |
| 2014/0028261 A1 | 1/2014 | Esswein et al. |
| 2014/0030572 A1 | 1/2014 | Esswein et al. |
| 2014/0030573 A1 | 1/2014 | Esswein et al. |
| 2014/0030631 A1 | 1/2014 | Esswein et al. |
| 2014/0051002 A1 | 2/2014 | Esswein et al. |
| 2014/0051003 A1 | 2/2014 | Esswein et al. |
| 2014/0080035 A1 | 3/2014 | Esswein et al. |
| 2014/0138576 A1 | 5/2014 | Esswein et al. |
| 2014/0178735 A1 | 6/2014 | Wang et al. |
| 2014/0193687 A1 | 7/2014 | Park et al. |
| 2014/0239906 A1 | 8/2014 | Anderson et al. |
| 2014/0274936 A1 | 9/2014 | Piccariello et al. |
| 2014/0349177 A1 | 11/2014 | Chung et al. |
| 2014/0370403 A1 | 12/2014 | Narayan et al. |
| 2014/0377666 A1 | 12/2014 | Kodama et al. |

(56) References Cited

U.S. PATENT DOCUMENTS

| | | |
|---|---|---|
| 2015/0236543 A1 | 8/2015 | Brushett et al. |
| 2015/0372333 A1 | 12/2015 | Odom et al. |
| 2016/0066578 A1 | 3/2016 | Ala'Aldeen et al. |
| 2016/0149251 A1 | 5/2016 | Reece |
| 2016/0208165 A1 | 7/2016 | Li et al. |
| 2016/0264603 A1 | 9/2016 | Esswein et al. |
| 2016/0268623 A1 | 9/2016 | Esswein et al. |
| 2016/0272659 A1 | 9/2016 | King et al. |
| 2016/0276693 A1 | 9/2016 | Goeltz et al. |
| 2016/0276694 A1 | 9/2016 | Goeltz et al. |
| 2016/0276695 A1 | 9/2016 | Esswein et al. |
| 2017/0253620 A1 | 9/2017 | Humbarger et al. |
| 2017/0256811 A1 | 9/2017 | Humbarger et al. |
| 2017/0271704 A1 | 9/2017 | Morris-Cohen |
| 2018/0029965 A1 | 2/2018 | Millard |
| 2018/0029966 A1 | 2/2018 | Millard et al. |
| 2018/0105544 A1 | 4/2018 | Humbarger et al. |

FOREIGN PATENT DOCUMENTS

| | | |
|---|---|---|
| EP | 0814527 A2 | 12/1997 |
| EP | 1290068 A2 | 3/2003 |
| EP | 1411576 A1 | 4/2004 |
| EP | 1901379 A1 | 3/2008 |
| EP | 2235781 A1 | 10/2010 |
| EP | 2463950 A1 | 6/2012 |
| FR | 1533662 A | 7/1968 |
| GB | 1354886 A | 6/1974 |
| WO | WO-95/12219 A1 | 5/1995 |
| WO | WO-1997/017354 A1 | 5/1997 |
| WO | WO-00/56302 A2 | 9/2000 |
| WO | WO-2004/095602 A2 | 11/2004 |
| WO | WO-2006/135958 A1 | 12/2006 |
| WO | WO-2007/044852 A2 | 4/2007 |
| WO | WO-2007/101284 A1 | 9/2007 |
| WO | WO-2011/075135 A1 | 6/2011 |
| WO | WO-2011/098781 A1 | 8/2011 |
| WO | WO-2011/149624 A1 | 12/2011 |
| WO | WO-2012/075810 A1 | 6/2012 |
| WO | WO-2013/006427 A1 | 1/2013 |
| WO | WO-2013/048603 A1 | 4/2013 |
| WO | WO-2014/052682 A2 | 4/2014 |
| WO | WO-2015/069439 A1 | 5/2015 |

OTHER PUBLICATIONS

Abdulghani et al., "Preparation and Characterization of Di-, Tri-, and Tetranuclear Schiff Base Complexes Derived from Diamines and 3,4-Dihydroxybenzaldehyde," Hindawi Publishing Corp, Bioinorganic Chemistry and Applications, 2013, pp. 1-14.
IUPAC Compendium of Chemical Terminology, "coordinatively unsaturated complex," 1997, http://old.iupac.org/goldbook/C01334.pdf.
Mansoor, "Mixed Metal Complexes of Copper (II), Nickel (II) and Zinc (II) Involving Dopa and Dopamine," International Journal of ChemTech Research, Jan.-Mar. 2010, vol. 2, No. 1, pp. 640-645.
International Search Report and Written Opinion from PCT/US17/14764, dated Apr. 20, 2017.
International Search Report and Written Opinion from PCT/US16/69190, dated May 3, 2017.
International Search Report and Written Opinion from PCT/US2017/022203, dated Jun. 6, 2017.
Vliet et al., "Hydroxyhydroquinone Triacetate," Organic Synthesys, 1941, Coll vol. 1, p. 317 (1941), vol. 4, p. 35 (1925) 3 pages.
International Search Report and Written Opinion dated Jan. 19, 2017 from International Application No. PCT/US16/58433.
International Search Report and Written Opinion dated Feb. 17, 2017 from International Application No. PCT/US16/65159.
Wang et al., "Issues in Freeze Drying of Aqueous Solutions," Chinese Journal of Chemical Engineering, 2012, 20(3), pp. 551-559.
Extended European Search Report from European Patent Application No. 15863021, dated May 17, 2018, 11 pages.
Ahn et al., "A Study of Benzene 1,2,4-Trisphosphate Derivatives as Inositol 1,4,5-Trisphosphate 3-Kinase Inhibitors," Bull. Korean Chem. Soc., 2002, pp. 515-517, vol. 23., No. 3.
Borgias, "Synthetic, structural, and physical studies of titanium complexes of catechol and 3,5-di-tert-butylcatechol," Inorg. Chem., Apr. 1984, 23(8), 1009-1016.
Bosch et al., "Novel Catalysis of Hydroquinone Autoxidation with Nitrogen Oxides," J. Org. Chem., 1994, pp. 2529-2536, 59.
Brezina, "Study of the reduction of oxygen on a carbon paste electrode in an alkaline medium," Coll. Czech. Chem. Commun., 1973, 38(10), 3024-3031.
Caulton, "Systematics and Future Projections Concerning Redox-Noninnocent Amide/Imine Ligands," Eur. J. Inor . Chem., Jan. 2012, 2012 (3), 435-443.
Cerofontain et al. "Sulfonation and sulfation on reaction of 1,2-dihydroxybenzene and its methyl ethers in concentrated aqueous sulfuric acid," Recl Trav Chim Pays-Bas, 1988, pp. 325-330, vol. 107.
Chen, "Solution Redox Couples for Electrochemical Energy Storage: I. Iron (III)-Iron (II) Complexes with O-Phenanthroline and Related Ligands," Journal of the Electrochemical Society, Jul. 1981, 128(7), 1460-1467.
Cohen, "The Association of Ferrocyanide Ions With Various Cations," J. Phys. Chem., Aug. 1957, 61(8), 1096-1100.
Davies, "Eiectroceramics from Source Materials via Molecular Intermediates: PbTi03 from Ti02 via [Ti(catecholate)3]2-," J. Am. Ceram. Soc., Aug. 1990, 73(8), 2570-2572.
Davies, "Electroceramics from Source Materials via Molecular Intermediates: BaTI03 from TI02 via [Ti(catecholate)3]2-," May 1990, J. Am. Ceram. Soc., Aug. 1990, 73(5), 1429-30.
Dehaen et al, "A Self-Assembled Complex with a Titanium (IV) Catecholate Core as a Potential Bimodal Contrast Agent," Chem Eur J, 2012, pp. 293-302, vol. 18.
Fryda, "Wastewater Treatment With Diamond Electrodes," Diamond Materials, Electrochemical Society Proceedings, 2000, 99(32), 473-483.
Gail, "Cyano Compounds, Inorganic" in Ullmann's Encyclopedia of Industrial Chemistry, 2012, 10, 674-710.
Hollandsworth, "Zinc/Ferrocyanide Battery Development Phase IV" Lockheed Missiles and Space Company, Inc., Contractor report, Sandia Contract DE-AC04-76DP00789, May 1985, 278 pages.
Kim, "Novel catalytic effects of Mn304 for all vanadium redox flow batteries," Chem. Commun., Apr. 2012, 48(44), 5455-5457.
Kulesza, "Electrochemical preparation and characterization of hybrid films composed of Prussian blue type metal hexacyanoferrate and conducting polymer," Electrochimica Acta, Aug. 2001, 46(26-27), 4065-4073.
Lang et al., "Studies on the Biosynthesis of Bovilactone-4,4 and Related Fungal Meroterpenoids," Eur. J. Org. Chem., 2008, pp. 3544-3551.
Lang et al., "Studies on the Structure and Biosynthesis of Tridentoquinone and Related Meroterpenoids from the Mushroom *Suillus tridentinus* (Boletales)," Eur. J. Org. Chem., 2008, pp. 816-825.
Leung, "An undivided zinc-cerium redox flow battery operating at room temperature (295 K)," Electrochemistry Communications, 2011, vol. 13, pp. 770-773.
Leung, "Ce(III)/Ce(iV) in methanesulfonic acid as the positive half cell of a redox flow battery," Electrochimica Acta, 2011, vol. 56, pp. 2145-2153.
Leung, "Characterization of a zinc-cerium flow battery," Journal of Power Sources, 2011, vol. 195, pp. 5174-5185.
Leung, "Development of a Zinc-Cerium Redox Flow Battery", 2011, 352 pages.
Leung, "Zinc deposition and dissolution in methanesulfonic acid onto a carbon composite electrode as the negative electrode reactions in a hybrid redox flow battery," Electrochimica Acta, 2011, vol. 56, pp. 6536-6546.

(56) References Cited

OTHER PUBLICATIONS

Maison, et al., "Effect of Calcination Temperature on Phase Transformation and Particle size of Barium Titanate Fine Powders Synthesized by the Catecholate Process," ScienceAsia, 2001, pp. 239-243, 27.
McOmie et al. "The Thiele-Winter Acetoxylation of Quinones," Organic Reactions, 1972, pp. 199-277, 19, John Wiley and Sons, Inc., New York.
Modiba, "Electrochemical impedance spectroscopy study of Ce(IV) with aminopolycarboxylate ligands for redox flow batteries applications," Journal of Power Sources, May 2012, vol. 205, 1-9.
Modiba, "Electrochemical study of cerium(IV) in the presence of ethylenediaminetetraacetic acid (EDTA) and diethylenetriaminepentaacetate (DTPA) ligands," Journal of Applied Electrochemistry, Sep. 2008, 38(9), 1293-1299.
Modiba, "Electrolytes for redox flow battery systems," Dissertation presented for the degree of Doctor of Philosophy Chemistry at the University of Stellenbosch, Department of Chemistry and Polymer Science, Mar. 2010.
Murakami et al., "The Chelating Behavior of Catechol-4-sulfonate with Iron(III) Ion," Bulletin of the Chemical Society of Japan, 1963, pp. 1408-1411; vol. 36.
Nguyen, "Flow Batteries," The Electrochemical Society Interface, Fall2010, 19(3), 54-56.
Pharr, "Infrared Spectroelectrochemical Analysis of Adsorbed *Hexacyanoferrate* Species Formed during Potential Cycling in the Ferrocyanide/Ferricyanide Redox Couple," Anal. Chem., Nov. 1997, 69(22), 4673-4679.
Raymond , "Coordination isomers of biological iron transport compounds. VI. Models of the enterobactin coordination site. A crystal field effect in the structure of potassium tris( catecholato)chromate( III) and -ferrate( III) sesq u ihyd rates, K3[M( 02C6H4 )3]. 1 . 5H20, M=chromium, iron," J. Am. Chem. Soc., Mar. 1976, 98(7), 1767-1774.
Saito et al. "DPPH radical-scavenging reaction of protocatechuic acid: differnce in reactivity between acids and their esters," Helv Chim Acta, 2006, pp. 1395-1407, vol. 89.
Sever et al, "Visible absorption spectra of metal-catecholate and metal-tironate complexes," Dalton Trans., pp. 1061-1072, 2004.
Sigma-Aldrich Tris(hydroxymethyl)aminomethane, 2015.
Soloveichik, "Flow Batteries: Current Status and Trends," 2015, Chem. Rev., 115 (20), pp. 11533-11558.
Sommer, "Titanium (IV) complexes with ligands having oxygen donor atoms in aqueous solutions," Zeitschrift fur Anorganische und Aligemeine Chemie, Mar. 1963, pp. 191-197, vol. 321, issue 3-4.
Spyroudis, "Hydroxyquinones: Synthesis and Reactivity," Molecules, 2000, pp. 1291-1330, 5.
Steenken, "One-electron redox potentials of phenols. Hydroxy- and aminophenols and related compounds of biological interest," J. Phys. Chem., Sep. 1982, 86(18), 3661-3667.
Torres-Gomez, "Energy Storage in Hybrid Organic-Inorganic Materials Hexacyanoferrate-Doped Polypyrrole as Cathode in Reversible Lithium Cells," J. of The Electrochemical Society, 2000, 147(7), 2513-2516.
Trant, "Solubility of Sodium Ferrocyanide and Potassium Ferrocyanide in Solutions of NaOH and KOH Mixtures at 25.degree. C," University of Rochester, The David T. Kearns Center, Xerox Undergraduate Research Fellows Program, Jul. 28, 2011, 1 page.
Vercillo, "Solubility of Sodium Ferrocyanide in Sodium Hydroxide and Potassium Ferrocyanide in Potassium Hydroxide," University of Rochester, The David T. Kearns Center, Xerox Undergraduate Research Fellows Program, Jul. 28, 2011, 1 page.
Wang, "Determination of iron, titanium, osmium, and aluminum with tiron by reversephase high performance liquid chromatography/electrochemistry," Microchem. J., Jun. 1991, 43(3), 191-197.
Weber, "Redox flow batteries: a review," Journal of Applied Electrochemistry, Oct. 2011, 41(10), 1137-1164.
Westervelt, "A Study of the Calcium Complex of the Potassium Salt of Catechol-4-Sulfonate in Aqueous, Alkalino Media," Jan. 1981, Doctoral Dissertation, retrieved from https://smartech.gatech.edu/bitstream/handle/1853/5723/westervelt-iii_hh.pdf.
Ali et al., "Synthesis and Processing Characteristics of $Ba_{0.65}Sr_{0.35}TiO_3$ Powders from Catecholate Precursors," J Am Ceram Soc, 1993, pp. 2321-2326, vol. 76, No. 9.
Devi et al., "pH-metric investigation on Mixed-Ligand Complexes of Ca(II), Mg(II) and Zn(II) with L-Dopa and 1,10 Phenantroline in Propylene glycol-Water Mixtures," RRJC, Oct.-Dec. 2012, vol. 1, Issue 1, pp. 13-22.
Xu, "Mechanics of metal-catecholate complexes: The roles of coordination state and metal types," Scientific Reports, Oct. 10, 2013, 3:2914, pp. 1-7.
Chi et al., "Structural characterization of Sr—Ti and Ba—Ti catecholate complexes: single source precursors fro SrTiO3 and BaTiO3 binary oxides," Journal of Physics and Chemistry of Solids, 2001, vol. 62, pp. 1871-1879.
International Search Report and Written Opinion from PCT/US17/43393, dated Oct. 5, 2017, 7 pages.

COORDINATIVELY UNSATURATED TITANIUM CATECHOLATE COMPLEXES AND PROCESSES ASSOCIATED THEREWITH

CROSS-REFERENCE TO RELATED APPLICATIONS

Not applicable.

STATEMENT REGARDING FEDERALLY SPONSORED RESEARCH OR DEVELOPMENT

Not applicable.

FIELD

The present disclosure generally relates to energy storage and, more specifically, to intermediates and methods used for preparing coordinatively saturated titanium (IV) catecholate complexes as active materials for flow batteries and other electrochemical systems.

BACKGROUND

Electrochemical energy storage systems, such as batteries, supercapacitors and the like, have been widely proposed for large-scale energy storage applications. Various battery designs, including flow batteries, have been considered for this purpose. Compared to other types of electrochemical energy storage systems, flow batteries can be advantageous, particularly for large-scale applications, due to their ability to decouple the parameters of power density and energy density from one another.

Flow batteries generally include negative and positive active materials in corresponding electrolyte solutions, which are flowed separately across opposing faces of a membrane or separator in an electrochemical cell containing negative and positive electrodes. The flow battery is charged or discharged through electrochemical reactions of the active materials that occur inside the two half-cells. As used herein, the terms "active material," "electroactive material," "redox-active material" or variants thereof synonymously refer to materials that undergo a change in oxidation state during operation of a flow battery or like electrochemical energy storage system (i.e., during charging or discharging). Although flow batteries hold significant promise for large-scale energy storage applications, they have often been plagued by sub-optimal energy storage performance (e.g., round trip energy efficiency) and limited cycle life, among other factors. Despite significant investigational efforts, no commercially viable flow battery technologies have yet been developed.

Metal-based active materials can often be desirable for use in flow batteries and other electrochemical energy storage systems. Although non-ligated metal ions (e.g., dissolved salts of a redox-active metal) can be used as an active material, it can often be more desirable to utilize coordination complexes for this purpose. As used herein, the terms "coordination complex, "coordination compound," "metal-ligand complex," or simply "complex" synonymously refer to a compound having at least one covalent bond formed between a metal center and a donor ligand. The metal center can cycle between an oxidized form and a reduced form in an electrolyte solution, where the oxidized and reduced forms of the metal center represent states of full charge or full discharge depending upon the particular half-cell in which the coordination compound is present. In certain instances, additional electrons can be transferred through the oxidation or reduction of one or more of the molecules constituting the ligands.

Titanium coordination compounds can be particularly desirable active materials for use in flow batteries and other electrochemical energy storage systems, since such metal complexes can provide good half-cell potentials (e.g., less than −0.3 V) and current efficiencies exceeding 85% at high current density values (e.g., greater than 100 mA/cm$^2$). Various catecholate complexes of titanium can be particularly desirable active materials, since they are relatively stable complexes and can exhibit a significant degree of solubility in aqueous solvents. Titanium catecholate coordination compounds having a coordination number of 6 are commonly used for this purpose, wherein the titanium center can cycle between an oxidation state of +3 and +4 during operation of a flow battery. As used herein, the term "coordination number" refers to the number of covalent bonds formed to a titanium center in a coordination compound. Although titanium (IV) is capable of having a coordination number of up to 8, a coordination number of 6 is far more common for this metal. As such, titanium catecholate coordination compounds having a coordination number of 6 are referred to herein as being "coordinatively saturated," and those having a coordination number of 5 or less, particularly a coordination number of 3-5 and more particularly a coordination number of 4, are referred to herein as being "coordinatively unsaturated."

Presently available methods for synthesizing coordinatively saturated titanium catecholate coordination compounds can be problematic from a number of standpoints. In some instances, it can be difficult to separate non-ligated catechol compounds from the coordination compounds after their synthesis. Titanium nanoparticles, which can be problematic when formulated into an electrolyte solution, can also form in some instances. Non-ligated catechol compounds can make it difficult to adjust the counterion content of an electrolyte solution to a sufficiently precise degree. Excessive counterions, for example, can decrease solubility of the active material due to a common ion effect, while insufficient counterions can result in incomplete formation of a desired salt form. It can also be problematic during typical syntheses of coordinatively saturated titanium (IV) coordination compounds to introduce different catecholate ligands onto a titanium center while maintaining compositional homogeneity, since typical syntheses rely upon a statistical reaction of mixed catechol compounds with titanium (IV). Mixtures of coordinatively saturated titanium (IV) coordination compounds bearing different groupings of catecholate ligands can be very difficult to separate from one another, and can be unsuitable for use within flow batteries in some instances.

In view of the foregoing, improved methods for synthesizing coordinatively saturated titanium coordination compounds containing catecholate ligands would be highly desirable to facilitate their use as active materials in energy storage applications. The present disclosure satisfies the foregoing needs and provides related advantages as well.

SUMMARY

In some embodiments, the present disclosure describes compositions containing a coordinatively unsaturated titanium (IV) coordination compound having a coordination number of 5 or less and containing two catecholate ligands, such that the composition is substantially free of non-ligated catechol compound.

In some embodiments, methods for synthesizing coordinatively unsaturated titanium (IV) coordination compounds can include: combining titanium tetrachloride and a catechol compound in an aprotic solvent to form a reaction mixture, and reacting the titanium tetrachloride with the catechol compound in an absence of base to form a coordinatively unsaturated titanium (IV) coordination compound having a coordination number of 5 or less and containing two catecholate ligands, such that the coordinatively unsaturated titanium (IV) coordination compound is insoluble in the reaction mixture.

In some embodiments, methods for synthesizing coordinatively saturated titanium coordination compounds can include: combining titanium tetrachloride and a catechol compound in an aprotic solvent to form a reaction mixture; reacting the titanium tetrachloride with the catechol compound in an absence of base to form a coordinatively unsaturated titanium (IV) coordination compound having a coordination number of 5 or less and containing two catecholate ligands; isolating the coordinatively unsaturated titanium (IV) coordination compound from the reaction mixture; combining the coordinatively unsaturated titanium (IV) coordination compound, a ligatable compound, and a base in a solvent; and reacting the coordinatively unsaturated titanium (IV) coordination compound with the ligatable compound to form a coordinatively saturated titanium (IV) coordination compound having four coordination sites occupied by the two catecholate ligands and two coordination sites occupied by one or more additional ligands.

In still other embodiments, methods for forming a flow battery can include: combining titanium tetrachloride and a catechol compound in an aprotic solvent to form a reaction mixture; reacting the titanium tetrachloride with the catechol compound in an absence of base to form a coordinatively unsaturated titanium (IV) coordination compound having a coordination number of 5 or less and containing two catecholate ligands, the coordinatively unsaturated titanium (IV) coordination compound being insoluble in the reaction mixture; isolating the coordinatively unsaturated titanium (IV) coordination compound from the reaction mixture as a solid; combining the coordinatively unsaturated titanium (IV) coordination compound, a ligatable compound, and an alkali metal base in an aqueous solvent; reacting the coordinatively unsaturated titanium (IV) coordination compound with the ligatable compound to form a coordinatively saturated titanium (IV) coordination compound having four coordination sites occupied by the two catecholate ligands and two coordination sites occupied by one or more additional ligands, the coordinatively saturated titanium (IV) coordination compound being soluble in the aqueous solvent; and incorporating an electrolyte solution comprising the coordinatively saturated titanium (IV) coordination compound in at least one half-cell of a flow battery.

The foregoing has outlined rather broadly the features of the present disclosure in order that the detailed description that follows can be better understood. Additional features and advantages of the disclosure will be described hereinafter. These and other advantages and features will become more apparent from the following description.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

The present disclosure is directed, in part, to coordinatively unsaturated titanium (IV) coordination compounds containing catecholate ligands and methods for synthesizing such coordination compounds. The present disclosure is also directed, in part, to methods for synthesizing coordinatively saturated titanium (IV) coordination compounds containing catecholate ligands from coordinatively unsaturated titanium catecholate coordination compounds. The present disclosure is also directed, in part, to methods for preparing an electrolyte solution and flow battery from a coordinatively unsaturated titanium (IV) coordination compound containing catecholate ligands.

The present disclosure may be understood more readily by reference to the following description taken in connection with the accompanying figures and examples, all of which form a part of this disclosure. It is to be understood that this disclosure is not limited to the specific products, methods, conditions or parameters described and/or shown herein. Further, the terminology used herein is for purposes of describing particular embodiments by way of example only and is not intended to be limiting unless otherwise specified. Similarly, unless specifically stated otherwise, any description herein directed to a composition is intended to refer to both solid and liquid versions of the composition, including solutions and electrolytes containing the composition, and electrochemical cells, flow batteries, and other energy storage systems containing such solutions and electrolytes. Further, it is to be recognized that where the disclosure herein describes an electrochemical cell, flow battery, or other energy storage system, it is to be appreciated that methods for operating the electrochemical cell, flow battery, or other energy storage system are also implicitly described.

It is also to be appreciated that certain features of the present disclosure may be described herein in the context of separate embodiments for clarity purposes, but may also be provided in combination with one another in a single embodiment. That is, unless obviously incompatible or specifically excluded, each individual embodiment is deemed to be combinable with any other embodiment(s) and the combination is considered to represent another distinct embodiment. Conversely, various features of the present disclosure that are described in the context of a single embodiment for brevity's sake may also be provided separately or in any sub-combination. Finally, while a particular embodiment may be described as part of a series of steps or part of a more general structure, each step or sub-structure may also be considered an independent embodiment in itself.

Unless stated otherwise, it is to be understood that each individual element in a list and every combination of individual elements in that list is to be interpreted as a distinct embodiment. For example, a list of embodiments presented as "A, B, or C" is to be interpreted as including the embodiments "A," "B," "C," "A or B," "A or C," "B or C," or "A, B, or C."

In the present disclosure, the singular forms of the articles "a," "an," and "the" also include the corresponding plural references, and reference to a particular numerical value includes at least that particular value, unless the context clearly indicates otherwise. Thus, for example, reference to "a material" is a reference to at least one of such materials and equivalents thereof.

In general, use of the term "about" indicates approximations that can vary depending on the desired properties sought to be obtained by the disclosed subject matter and is to be interpreted in a context-dependent manner based on functionality. Accordingly, one having ordinary skill in the art will be able to interpret a degree of variance on a case-by-case basis. In some instances, the number of significant figures used when expressing a particular value may be a representative technique of determining the variance permitted by the term "about." In other cases, the gradations in a series of values may be used to determine the range of variance permitted by the term "about." Further, all ranges in the present disclosure are inclusive and combinable, and references to values stated in ranges include every value within that range.

As discussed above, energy storage systems that are operable on a large scale while maintaining high efficiency values can be extremely desirable. Flow batteries employing coordination compounds as active materials have generated significant interest in this regard. Exemplary description of illustrative flow batteries, their use, and operating characteristics is provided hereinbelow. Coordinatively saturated titanium (IV) coordination compounds, particularly those containing at least one catecholate ligand, can be especially desirable due to their favorable half-cell potentials, high current efficiency values, and ready solubility in aqueous solutions, among other factors. As used herein, the term "catechol" refers to a compound having an aromatic ring bearing hydroxyl groups on adjacent carbon atoms (i.e., 1,2-hydroxyl groups). Optional substitution can also be present in addition to the 1,2-hydroxyl groups. As used herein, the term "catecholate" refers to a substituted or unsubstituted catechol compound that is bound to a metal center via a metal-ligand bond, particularly a titanium center in a +3 or +4 oxidation state. The optional substitution on catecholate ligands can serve a number of purposes such as, for example, altering the solubility characteristics and/or half-cell potentials of coordination compounds in which they are present. Monosulfonated catecholate ligands, for example, can improve the solubility of titanium (IV) coordination compounds in which they are present while maintaining electrochemical properties that are at least comparable to those obtained when only unsubstituted catecholate ligands are present. Catecholate ligands bearing an additional hydroxyl group, such as pyrogallol and gallic acid, can be similarly advantageous in this regard.

Although various techniques are available for synthesizing coordinatively saturated titanium (IV) coordination compounds (e.g., coordinatively saturated titanium (IV) coordination compounds containing catecholate ligands), none are believed to be suitable for supporting commercial energy storage applications requiring multi-pound to multi-ton quantities of active materials. In addition to scalability issues, purity and compositional homogeneity are among the factors that are presently lacking in current syntheses of coordinatively saturated titanium (IV) coordination compounds containing catecholate ligands. In addition, currently available syntheses directly produce coordinatively saturated titanium (IV) catecholate coordination compounds in a liquid solution, which can be costly and potentially hazardous to ship in large quantities from a manufacturing site to a site where a flow battery is deployed.

The present inventors discovered that coordinatively unsaturated titanium (IV) coordination compounds containing catecholate ligands have significantly different properties than do comparable coordinatively saturated titanium (IV) coordination compounds. Of most significance, coordinatively unsaturated titanium (IV) coordination compounds bearing catecholate ligands are markedly less soluble than are their coordinatively saturated counterparts. This surprising result allows coordinatively unsaturated titanium (IV) coordination compounds containing catecholate ligands to be readily isolated from a reaction mixture and, if necessary, undergo further purification, such as through solvent washing. After undergoing isolation and/or further purification, coordinatively unsaturated titanium (IV) coordination compounds containing catecholate ligands can then undergo further reaction with a ligatable compound in the presence of a base to introduce one or more additional ligands to the coordination sphere and form coordination compounds that are coordinatively saturated. The ligatable compound can be a catechol compound in some instances. Specifically, reaction of a ligatable compound with a coordinatively unsaturated titanium (IV) coordination compound in the presence of a base can form a coordinatively saturated titanium (IV) coordination compound and produce a desirable salt form thereof.

As such, the inventors discovered compositions that are distinct from those that are presently employed in the flow battery field and can serve as facile intermediates for synthesizing coordinatively saturated titanium (IV) coordination compounds that contain catecholate ligands. Syntheses and related processes employing the coordinatively unsaturated titanium (IV) coordination compounds can be particularly advantageous, since they can avert many of the issues presently associated with producing and using coordinatively saturated titanium (IV) coordination compounds containing catecholate ligands. For example, syntheses employing coordinatively unsaturated titanium (IV) coordination compounds as intermediates for producing coordinatively saturated titanium (IV) coordination compounds can allow improved purity and homogeneity to be realized, even on large scales. The improved purity and homogeneity can be especially beneficial when formulating electrolyte solutions for flow batteries. In addition, the ability to isolate coordinatively unsaturated titanium (IV) coordination compounds as solids can at least partially alleviate shipping costs and hazards.

Although coordinatively unsaturated titanium (IV) coordination compounds can be advantageous for the reasons outlined above, other metals can also be suitable in this regard. In particular, coordinatively unsaturated Zr and Hf coordination compounds, particularly those containing at least one catecholate ligand, can also be advantageous in the context of the present disclosure. Like the corresponding coordinatively saturated titanium (IV) coordination compounds, coordinatively saturated Zr and Hf coordination compounds can possess highly desirable properties when incorporated as an active material in a flow battery.

More particularly, coordinatively unsaturated titanium (IV) coordination compounds containing catecholate ligands can be produced through a reaction between titanium tetrachloride and one or more catechol compounds in an aprotic solvent. Advantageously, the aprotic solvent can be chosen such that the coordinatively unsaturated titanium (IV) coordination compounds precipitate as an insoluble material, thereby allowing ready isolation and/or purification to take place, if needed. Illustrative examples of suitable aprotic solvents are provided hereinbelow. Coordinatively unsaturated coordination compounds based upon other metals, such as Zr and Hf, can be synthesized in a similar manner.

Formation of coordinatively unsaturated titanium (IV) coordination compounds, having two catecholate ligands and a coordination number of 5 or less, as opposed to coordinatively saturated titanium (IV) coordination compounds, having three catecholate ligands and/or a coordination number of 6, can be facilitated by a number of factors which lead to a lower coordination number. First, the reaction between titanium tetrachloride and the catechol compound can be conducted with at most about two stoichiometric equivalents of the catechol compound relative to titanium tetrachloride. By limiting the amount of available ligand, lower coordination numbers can result. With larger amounts of ligand, coordinatively saturated titanium (IV) coordination compounds that are also insoluble in the reaction mixture can be formed under forcing conditions. The insoluble coordinatively saturated titanium (IV) coordination compounds can be subsequently converted to soluble coordinatively saturated titanium (IV) coordination compounds in the absence of base without additional ligands being present. In contrast, the coordinatively unsaturated titanium (IV) coordination compounds of the present disclosure undergo disproportionation under similar conditions (i.e., when additional ligand is absent). Second, the reaction between titanium tetrachloride and the catechol compound can take place in an absence of base, thereby leaving any excess catechol compound protonated and largely unavailable for complexing a titanium center. These approaches can be used in concert with one another, if desired, to promote formation of lower coordination numbers. In either case, any excess catechol compound or other soluble byproducts can be removed from the coordinatively unsaturated titanium (IV) coordination compounds of the present disclosure due to their limited solubility, if desired or needed.

Coordinatively unsaturated titanium (IV) coordination compounds containing catecholate ligands can also be used as an intermediate to synthesize coordinatively saturated titanium (IV) coordination compounds more reliably and with improved compositional homogeneity compared to conventional syntheses. Specifically, a coordinatively unsaturated titanium (IV) coordination compound can contain a first type of catecholate ligand obtained from a first catechol compound, and a second type of catecholate ligand can then be introduced using a second catechol compound when forming the corresponding coordinatively saturated titanium (IV) coordination compound. The first catechol compound and the second catechol compound can be the same (homoleptic) or different (heteroleptic). In the case where the first catechol compound and the second catechol compound are different, the present disclosure provides a ready route for synthesizing coordinatively saturated titanium (IV) coordination compounds that contain a fixed stoichiometry of mixed catecholate ligands. Conventional syntheses, in contrast, rely upon a statistical reaction of mixed ligands with the titanium center, forming a mixture of products with different combinations of ligands that can be difficult to separate from one another. Different catecholate ligands can also be introduced from different catechol compounds when forming the coordinatively unsaturated titanium (IV) coordination compounds, if desired. Accordingly, depending upon the desired outcome of a particular synthetic process, coordinatively saturated titanium (IV) coordination compounds having the formula $Ti(L^1)(L^2)(L^3)^{2-}$ can be produced, where $L^1$, $L^2$, and $L^3$ are catecholate ligands, $L^1$ and $L^2$ are introduced when forming the coordinatively unsaturated titanium (IV) coordination compound, $L^3$ is introduced when forming the coordinatively saturated titanium (IV) coordination compound, and $L^1=L^2=L^3$, $L^1=L^2 \neq L^3$, $L^1 \neq L^2=L^3$, $L^2 \neq L^1=L^3$, or $L^1 \neq L^2 \neq L^3$.

Finally, the coordinatively unsaturated titanium (IV) coordination compounds disclosed here are further advantageous in that isolation of these coordination compounds allows hydrogen chloride produced during their syntheses to be completely removed. By completely removing hydrogen chloride, a precise quantity of base can be used to convert the coordinatively unsaturated titanium (IV) coordination compounds into the corresponding coordinatively saturated titanium (IV) coordination compounds upon reacting with at least a stoichiometric equivalent of a catechol compound or another suitable ligand. By only using the amount of base needed to form the coordinatively saturated titanium (IV) coordination compound, excess salts in the resulting solution can be minimized. Excess salts can be undesirable due to their ability to decrease the solubility of the coordinatively saturated titanium (IV) coordination compound due to a common ion effect.

Accordingly, in various embodiments, the present disclosure provides compositions containing a coordinatively unsaturated titanium (IV) coordination compound having a coordination number of 5 or less and containing two catecholate ligands. In some embodiments, the compositions can be substantially free of non-ligated catechol compound, and in some or other embodiments, the coordinatively unsaturated titanium (IV) coordination compound can be obtained as an isolated solid. In some embodiments, isolation of the coordinatively unsaturated titanium (IV) coordination compound as a solid can promote the substantial removal of non-ligated catechol compound that remains following synthesis of the coordination compound. In other embodiments, a catechol compound can be provided as the limiting reagent during formation of the coordination compound, thereby resulting in its substantial consumption and exclusion of non-ligated catechol compound from the composition. Other early transition metals, such as Zr and Hf, for example, can also form similar coordinatively unsaturated coordination compounds in alternative embodiments of the present disclosure.

Without being bound by any correctness of theory, it is believed that the coordinatively unsaturated titanium (IV) coordination compound is described by Formula 1

$$Ti(L)_2, \qquad \text{(Formula 1)}$$

wherein L is a catecholate ligand and each catecholate ligand is complexed to titanium as a bidentate ligand. In such embodiments, the coordinatively unsaturated titanium (IV) coordination compound has a coordination number of 4. In some embodiments, the two catecholate ligands can be a first catecholate ligand and a second catecholate ligand that are the same (i.e., L is $L_1$ and $L_2$ with $L_1=L_2$). In other embodiments, the two catecholate ligands can be a first catecholate ligand and a second catecholate ligand that are different (i.e., L is $L_1$ and $L_2$ with $L_1 \neq L_2$).

Referring again to Formula 1, it can be seen that when L is a catecholate ligand lacking ionizable functional groups, the coordinatively unsaturated titanium (IV) coordination compound is electrically neutral and bears no counterions. This feature advantageously allows the counterion form of the coordinatively saturated titanium (IV) coordination compounds resulting therefrom to be readily adjusted.

In alternative embodiments wherein L bears an ionizable functional group, at least one counterion can be associated with the coordinatively unsaturated titanium (IV) coordination compound. For example, in the case where L bears a negatively ionized functional group (e.g., a sulfonic acid or carboxylic acid group), one or more positive counterions (cations) can be present to maintain charge balance. Likewise, in the case where L bears a positively ionized functional group (e.g., an ammonium, quaternary ammonium or phosphonium group), one or more negative counterions (anions) can be present to maintain charge balance. In the case where L represents two ionized catecholate ligands that bear the same charge (+1 or −1), two counterions (either two cations or two anions) can be associated with the coordinatively unsaturated titanium (IV) coordination compound to maintain charge balance. However, in the case where L represents two ionized catecholate ligands that are different and bear opposite charges, the coordinatively unsaturated titanium (IV) coordination compound can again lack a counterion.

In more specific embodiments, the two catecholate ligands can constitute a first catecholate ligand and a second catecholate ligand, in which at least one of the first catecholate ligand and the second catecholate ligand is a monosulfonated catecholate ligand or a catecholate ligand bearing an additional hydroxyl group. In some embodiments, both the first catecholate ligand and the second catecholate ligand can be a monosulfonated catecholate ligand, a catecholate ligand bearing an additional hydroxyl group, or any combination thereof. Such catecholate ligands can be advantageous for promoting solubility in aqueous solvents upon formation of coordinatively saturated titanium (IV) coordination compounds, which are discussed further hereinbelow.

Methods for forming and using the coordinatively unsaturated titanium (IV) coordination compounds described hereinabove are also provided by the present disclosure. In various embodiments, methods for forming the coordinatively unsaturated titanium (IV) coordination compounds can include combining titanium tetrachloride and a catechol compound in an aprotic solvent to form a reaction mixture, and reacting the titanium tetrachloride with the catechol compound in an absence of base to form a coordinatively unsaturated titanium (IV) coordination compound having a coordination number of 5 or less and containing two catecholate ligands, and in which the coordinatively unsaturated titanium (IV) catecholate coordination compound is insoluble in the reaction mixture. In more particular embodiments, the coordinatively unsaturated titanium (IV) coordination compounds can have a coordination number of 4, in which the two catecholate ligands are each chelated to titanium. Other coordinatively unsaturated coordination compounds based upon other early transition metals can be synthesized similarly.

In more specific embodiments, combining the titanium tetrachloride with the catechol compound can take place by adding the titanium tetrachloride to the catechol compound in the aprotic solvent.

In some embodiments, the titanium tetrachloride can be combined neat with the catechol compound in the aprotic solvent. In other embodiments, a solution of titanium tetrachloride in an aprotic solvent can be added to form the reaction mixture. The aprotic solvent in which the titanium tetrachloride is present can be the same as or different than the aprotic solvent in which the catechol compound is present. Depending upon the scale at which the reaction is run, adding a solution of titanium tetrachloride can facilitate transfer of this reagent compared to neat transfer, and dilution effects can help offset the exothermicity of the reaction. Particularly at larger scales, neat transfer of titanium tetrachloride can be more advantageous in some instances. Such considerations will be familiar to one having ordinary skill in the art.

Again without being bound by any theory or mechanism, it is believed that by reacting the titanium tetrachloride and the catechol compound in an absence of base, any excess catechol compound can remain substantially protonated and thereby be precluded from reacting with the initially formed coordinatively unsaturated titanium (IV) coordination compound to form a coordinatively saturated titanium (IV) coordination compound containing three catecholate ligands. Preclusion from forming a coordinatively saturated titanium (IV) coordination compound at this juncture can be further aided by using at most about 2 stoichiometric equivalents of the catechol compound in the reaction mixture relative to the titanium tetrachloride. These factors, either alone or in combination, can favor the formation of a coordinatively unsaturated titanium (IV) coordination compound having a coordination number of 4. As such, the methods described herein can provide a coordinatively unsaturated titanium (IV) coordination compound in which the titanium center is complexed by two catecholate ligands that are bound in a bidentate manner, thereby filling four coordination sites.

A wide variety of aprotic organic solvents can be suitable for forming the coordinatively unsaturated titanium (IV) coordination compounds described herein as an insoluble reaction product from the reaction mixture. Suitable aprotic organic solvents can include, but are not limited to, benzene, toluene, xylenes, cyclohexane, dichloromethane, dichloroethane, chloroform, ethyl ether, methyl t-butyl ether, p-dioxane, acetonitrile, tetrahydrofuran, ethyl acetate, isopropyl acetate, ligroin and other hydrocarbon solvents, and any combination thereof.

Although alcohol solvents are protic solvents and are reactive with titanium tetrachloride to form titanium alkoxides, they can also be useful in alternative embodiments of the present disclosure. Specifically, the initially formed titanium alkoxides can react further to form a coordination complex containing catecholate ligands in a similar manner to that described above. Accordingly, in some embodiments of the present disclosure, an alcohol solvent can be used alone or in combination with an aprotic solvent when forming a coordinatively unsaturated titanium (IV) coordination compound.

In some embodiments, the coordinatively unsaturated titanium (IV) coordination compounds described herein can be reacted directly to form coordinatively saturated titanium (IV) coordination compounds containing two catecholate ligands and one or more additional ligands, such that the coordination number is 6. In some instances, the one or more additional ligands can be a catecholate ligand or a substituted catecholate ligand. Further details concerning the formation of coordinatively saturated titanium (IV) coordination compounds are provided hereinbelow. Any insoluble coordinatively saturated titanium (IV) coordination compounds that form in concert with the coordinatively unsaturated titanium (IV) coordination compounds can also be converted to corresponding soluble coordinatively saturated titanium (IV) coordination compounds during this process. However, it is desirable to limit the occurrence of insoluble coordinatively saturated titanium (IV) coordination compounds when forming the coordinatively unsaturated titanium (IV) coordination compounds in order to avoid working with mixtures of potentially uncertain stoichiometry.

More desirably, the methods of the present disclosure can include isolating the coordinatively unsaturated titanium (IV) coordination compound from the reaction mixture as a solid. In illustrative embodiments, the coordinatively unsaturated titanium (IV) coordination compound can be isolated from the reaction mixture by, for example, filtration, decantation, centrifugation, or any combination thereof. Upon being isolated, the methods of the present disclosure can further include rinsing the coordinatively unsaturated titanium (IV) coordination compound with a washing solvent. Rinsing the coordinatively unsaturated titanium (IV) coordination compound with a washing solvent can remove residual, non-ligated catechol compounds or other byproducts formed during synthesis of the coordination compounds. Suitable washing solvents are not believed to be particularly limited, provided that the coordinatively unsaturated titanium (IV) coordination compounds remain insoluble therein. In illustrative embodiments, suitable washing solvents can include the aprotic solvents from which the coordinatively unsaturated titanium (IV) coordination compound was formed. In other embodiments, suitable washing solvents for the coordinatively saturated titanium (IV) coordination compounds can include protic organic solvents such as alcohols, particularly methanol, ethanol or isopropanol. In still other embodiments, suitable washing solvents for the coordinatively saturated titanium (IV) coordination compounds can include aqueous solvents such as water, or mixtures of water with water-miscible organic solvents, provided that the pH is below 7. As discussed above, alkaline aqueous solutions can react with the coordinatively unsaturated titanium (IV) coordination compound in the absence of an additional ligatable compound, such that a disproportionation reaction occurs. Titanium dioxide forms in the disproportionation process. In contrast, when an additional ligatable compound is present, an alkaline aqueous solution can promote the formation of a coordinatively saturated titanium (IV) coordination compound.

In further embodiments, methods of the present disclosure can include reacting the coordinatively unsaturated titanium (IV) coordination compound with a ligatable compound to form a coordinatively saturated titanium (IV) coordination compound having four coordination sites occupied by the two catecholate ligands and two coordination sites occupied by one or more additional ligands. Suitable ligatable compounds are discussed hereinafter. The one or more additional ligands that are coordinated to the titanium center can be bound in a monodentate fashion (i.e., in the case of two additional ligands) or in a bidentate fashion (i.e., in the case of one additional ligand). In some embodiments, the one or more additional ligands can be an additional catecholate ligand, which can be the same or different than the two catecholate ligands that were present in the coordinatively unsaturated titanium (IV) coordination compound.

Accordingly, in more specific embodiments, methods of the present disclosure can further include combining the coordinatively unsaturated titanium (IV) coordination compound, a ligatable compound, and a base in a solvent; and reacting the coordinatively unsaturated titanium (IV) coordination compound with the ligatable compound to form a coordinatively saturated titanium (IV) coordination compound having four coordination sites occupied by the two catecholate ligands and two coordination sites occupied by one or more additional ligands. In the case of the ligatable compound being a catechol compound, the one or more additional ligands represent a catecholate ligand that is bound to the titanium center in a bidentate fashion. The coordinatively unsaturated titanium (IV) coordination compound can be reacted to form the coordinatively saturated titanium (IV) coordination compound after isolation from the reaction mixture from which it was formed, or the coordinatively unsaturated titanium (IV) coordination compound can be reacted directly in the reaction mixture without undergoing further purification in some embodiments.

In still more specific embodiments, the coordinatively saturated titanium (IV) coordination compound can be formed in a solvent in which the coordinatively saturated titanium (IV) coordination compound is substantially soluble. In some embodiments, the solvent can be an aqueous solvent, such as water or a mixture of water and a water-miscible organic solvent. Aqueous solvents can be particularly suitable for promoting solubilization of the coordinatively saturated titanium (IV) coordination compounds disclosed herein. The resulting aqueous solutions can be particularly suitable for use as an electrolyte solution within a flow battery, as discussed further herein.

In various embodiments, the base used in conjunction with forming the coordinatively saturated titanium (IV) coordination compound can be one or more alkali metal bases, an ammonium base, or any combination thereof. In more particular embodiments, a mixture of sodium hydroxide and potassium hydroxide can be suitable alkali metal bases for forming the coordinatively saturated titanium (IV) coordination compound. A mixture of sodium hydroxide and potassium hydroxide can desirably provide a mixture of sodium and potassium counterions to the coordinatively saturated titanium (IV) coordination compounds. A mixed sodium and potassium counterion form of the coordinatively saturated titanium (IV) coordination compounds can help promote their solubility in aqueous solvents in comparison to the solubility obtained in the presence of any single alkali metal counterion.

By carefully controlling the stoichiometric quantity of alkali metal base that is added to the coordinatively unsaturated titanium (IV) coordination compound (based on the molar amount of titanium tetrachloride that is initially present), a desired pH can be obtained in the aqueous solution formed upon conversion to the coordinatively saturated titanium (IV) coordination compounds. Moreover, by carefully controlling the stoichiometric quantity of alkali metal base, the introduction of excess alkali metal ions can be avoided, which might otherwise decrease solubility due to a common ion effect. Because the coordinatively unsaturated titanium (IV) coordination compounds can be isolated and purified to remove HCl gas generated during their initial formation, essentially all of the alkali metal base can go toward forming an alkali metal salt form of the coordinatively saturated titanium (IV) coordination compounds rather than neutralizing the residual HCl.

In alternative embodiments of the present disclosure, alkali metal bases such as alkali metal oxides, alkali metal carbonates, and alkali metal bicarbonates can be used as the base when forming the coordinatively saturated titanium (IV) coordination compound. Optionally, these alkali metal bases can be used in combination with the alkali metal hydroxide bases discussed above. Again, a mixture of sodium and potassium counterions can be introduced through the particular choice of the alkali metal bases used. For example, an alkali metal hydroxide having a first alkali metal counterion can be combined with an alkali metal carbonate or bicarbonate having a second alkali metal counterion to accomplish the foregoing.

As still another alternative to alkali metal hydroxide bases, ammonium bases, such as ammonium hydroxide, can also be used in some embodiments of the present disclosure. In some embodiments of the present disclosure, a mixture of ammonium hydroxide and an alkali metal base can be used in conjunction with forming the coordinatively saturated titanium (IV) coordination compounds as disclosed herein.

In illustrative embodiments, an amount of the base can be chosen to produce a solution containing the coordinatively saturated titanium (IV) coordination compound and having a pH ranging between about 7 and about 14. In more particular embodiments, the solution can have a pH ranging between about 6 and about 8, or between about 7 and about 8, or about 9 and about 10, or about 10 and about 12, or about 12 and about 14. The pH range can be chosen depending upon the particular application in which the solution of the coordinatively saturated titanium (IV) coordination compound is to be employed.

As indicated above, ligatable compounds other than catechol compounds can lead to ligands other than catecholate ligands being present in the coordinatively saturated titanium (IV) complexes disclosed herein. Illustrative ligands that can be present include, for example, ascorbate, citrate, glycolate, a polyol, gluconate, hydroxyalkanoate, acetate, formate, benzoate, malate, maleate, phthalate, sarcosinate, salicylate, oxalate, urea, polyamine, aminophenolate, acetylacetonate, and lactate. Aromatic, substituted aromatic, heteroaromatic, substituted heteroaromatic, heterocyclic, substituted heterocyclic, and alicyclic compounds with heteroatom functionality can also serve as ligands, any of which can be monocyclic, polycyclic or fused. Where chemically feasible, it is to be recognized that such ligands can be optionally substituted with at least one group selected from among $C_{1-6}$ alkoxy, $C_{1-6}$ alkyl, $C_{1-6}$ alkenyl, $C_{1-6}$ alkynyl, 5- or 6-membered aryl or heteroaryl groups, a boronic acid or a derivative thereof, a carboxylic acid or a derivative thereof, cyano, halide, hydroxyl, nitro, sulfonate, a sulfonic acid or a derivative thereof, a phosphonate, a phosphonic acid or a derivative thereof, or a glycol, such as polyethylene glycol, any of which, if chemically feasible, can be further substituted. Where feasible, neighboring substituents can form or be bonded to alicyclic, aromatic, heteroaromatic or heterocyclic rings that can optionally be further substituted. Monocyclic, polycyclic and/or fused ring systems can be produced. Alkanoate includes any of the alpha, beta, and gamma forms of these ligands. Polyamines include, but are not limited to, ethylenediamine, ethylenediamine tetraacetic acid (EDTA), and diethylenetriamine pentaacetic acid (DTPA).

Suitable ligands that can be present in the coordinatively saturated titanium (IV) coordination compounds also include, for example, monodentate ligands such as carbonyl or carbon monoxide, nitride, oxo, hydroxo, water, sulfide, thiols, pyridine, pyrazine, and the like. Suitable ligands that can be present in the coordinatively saturated titanium (IV) coordination compounds also include bidentate ligands such as, for example, bipyridine, bipyrazine, ethylenediamine, diols (including ethylene glycol), and the like. Any of these ligands can be further substituted, if chemically feasible. Where feasible, neighboring substituents can form or be bonded to alicyclic, aromatic, heteroaromatic or heterocyclic rings that can optionally be further substituted. Monocyclic, polycyclic and/or fused ring systems can be produced.

Catechol compounds suitable for use in the various embodiments described herein are not considered to be particularly limited. In some embodiments, the catechol compound can be o-catechol itself (i.e., unsubstituted 1,2-dihydroxybenzene). In some or other embodiments, the catechol compound can include at least one substituted catechol compound, which can optionally be present in combination with an unsubstituted catechol compound. In particular embodiments, 3,4-dihydroxybenzenesulfonic acid can be an especially desirable substituted catechol compound. Pyrogallol and gallic acid are also substituted catechol compounds that can be particularly desirable. Other suitable substituted catechol compounds can include, for example, bis-catechol compounds that are bridged by one or two heteroatom bridging groups (e.g., N, O or S-containing), where the catechol compounds or the heteroatom bridging group(s) can be further substituted, if chemically feasible. Bridged compounds that result in formation of one or more rings can have alicyclic, aromatic, heteroaromatic or heterocyclic rings, any of which can be optionally be further substituted. Monocyclic, polycyclic and/or fused ring systems can be produced.

Again remaining unbound by any theory or mechanism, it is believed that, in some embodiments, the coordinatively saturated titanium (IV) coordination compounds discussed herein can be characterized by Formula 2

$$D_2Ti(L)_3, \quad \text{(Formula 2)}$$

wherein D is an alkali metal ion, ammonium ion, or any combination thereof, and L is a catecholate ligand or mixture of catecholate ligands. In alternative embodiments, the coordinatively saturated titanium (IV) coordination compounds can be characterized by Formula 3

$$D_2Ti(L_1)(L_2)(L_3)_q, \quad \text{(Formula 3)}$$

wherein $L_1$ and $L_2$ are a catecholate ligand or substituted catecholate ligand, $L_3$ is a non-catecholate monodentate or bidentate ligand, and q is 1 or 2. Alternative non-catecholate ligands include certain exemplary ligands described above.

In still more specific embodiments, D can represent an alkali metal ion or mixture of alkali metal ions. In specific embodiments, D can be defined by $Na_mK_n$, wherein m+n=2, provided that L does not bear a charged functional group. In some embodiments, both m and n are non-zero numbers, and they can be equal or non-equal to one another. In some embodiments, a ratio of m to n can range between about 1:10 to about 10:1, or between about 1:5 or about 5:1. In some embodiments, substantially equal molar quantities of sodium and potassium can be present in coordinatively saturated titanium (IV) coordination compound discussed herein.

In some embodiments, the aqueous solvent in which the coordinatively saturated titanium (IV) coordination compound is formed can be substantially free of an organic solvent. In other embodiments, the aqueous solvent used when forming the coordinatively saturated titanium (IV) coordination compounds can contain at least some amount of organic solvent. In some embodiments, the aqueous solvent can contain trace or non-trace amounts of the aprotic solvent used in conjunction with forming the coordinatively unsaturated titanium (IV) coordination compounds. In some or other embodiments, a quantity of organic solvent can be added to the aqueous solvent. Organic solvents added to the aqueous solvent can include water-miscible organic solvents such as, for example, alcohol or glycol solvents.

In more specific embodiments, the aqueous solvent can contain at least about 98% water by weight. In other more specific embodiments, the aqueous solvent can contain at least about 55% water by weight, or at least about 60% water by weight, or at least about 65% water by weight, or at least about 70% water by weight, or at least about 75% water by weight, or at least about 80% water by weight, or at least about 85% water by weight, or at least about 90% water by weight, or at least about 95% water by weight. In some embodiments, the aqueous solvent can be free of water-miscible organic solvents and consist of water alone.

In further embodiments, the aqueous solvent can include a viscosity modifier, a wetting agent, a buffer, or any combination thereof. Suitable viscosity modifiers can include, for example, corn starch, corn syrup, gelatin, glycerol, guar gum, pectin, and the like. Other suitable examples will be familiar to one having ordinary skill in the art. Suitable wetting agents can include, for example, various non-ionic surfactants and/or detergents. In some or other embodiments, the aqueous phase can further include a glycol or a polyol. Suitable glycols can include, for example, ethylene glycol, diethylene glycol, and polyethylene glycol. Suitable polyols can include, for example, glycerol, mannitol, sorbitol, pentaerythritol, and tris(hydroxymethyl)aminomethane. Illustrative buffers that can be present include, but are not limited to, salts of phosphates, borates, carbonates, silicates, tris(hydroxymethyl)aminomethane (TRIS), 4-(2-hydroxyethyl)-1-piperazineethanesulfonic acid (HEPES), piperazine-N,N'-bis(ethanesulfonic acid) (PIPES), or any combination thereof. Inclusion of any of these components in the aqueous solvent can help maintain the coordinatively saturated titanium (IV) coordination compound in a dissolved form and/or facilitate incorporation of the aqueous solution in a flow battery, for example.

In various embodiments of the present disclosure, an aqueous solvent containing the coordinatively saturated titanium (IV) coordination compound can have a concentration of the coordination compound of about 0.5 M or above. In more particular embodiments, the concentration of can range between about 0.5 M and about 2 M, or a between about 0.75 M and about 1.5 M or between about 1 M and about 2 M.

In some embodiments, the aqueous solvent can further include one or more mobile ions (i.e., an extraneous electrolyte) for use as an electrolyte solution in a flow battery or similar electrochemical system. In some embodiments, suitable mobile ions can include proton, hydronium, or hydroxide. In other various embodiments, mobile ions other than proton, hydronium, or hydroxide can be present, either alone or in combination with proton, hydronium or hydroxide. Such alternative mobile ions can include, for example, alkali metal or alkaline earth metal cations (e.g., $Li^+$, $Na^+$, $K^+$, $Mg^{2+}$, $Ca^{2+}$ and $Sr^{2+}$) and halides (e.g., $F^-$, $Cl^-$, or $Br^-$). Other suitable mobile ions can include, for example, ammonium and tetraalkylammonium ions, chalcogenides, phosphate, hydrogen phosphate, phosphonate, nitrate, sulfate, nitrite, sulfite, perchlorate, tetrafluoroborate, hexafluorophosphate, and any combination thereof. In some embodiments, less than about 50% of the mobile ions can constitute protons, hydronium, or hydroxide. In other various embodiments, less than about 40%, less than about 30%, less than about 20%, less than about 10%, less than about 5%, or less than about 2% of the mobile ions can constitute protons, hydronium, or hydroxide.

As indicated above, coordinatively saturated titanium (IV) coordination compounds and electrolyte solutions resulting therefrom can be incorporated in flow batteries and related electrochemical systems. Further disclosure on suitable flow batteries and their operating parameters follows hereinafter.

In various embodiments, flow batteries of the present disclosure can include a first half-cell containing a first electrolyte solution and a second half-cell containing a second electrolyte solution, in which at least one of the first electrolyte solution and the second electrolyte solution contains a coordinatively saturated titanium (IV) coordination compound having a catecholate ligand. According to some embodiments, a different active material is employed in the electrolyte solution not containing the coordinatively saturated titanium (IV) coordination compound. Methods for forming such flow batteries are also expressly disclosed herein, as discussed hereinbelow.

In more specific embodiments, flow batteries of the present disclosure can include a first electrolyte solution containing a coordinatively saturated titanium (IV) coordination compound containing a catecholate ligand and a second electrolyte solution having a different active material than the first electrolyte solution. In still more specific embodiments, the second electrolyte solution can be an aqueous solution containing an iron hexacyanide complex. Iron hexacyanide complexes can be particularly desirable active materials due to their facile electrode kinetics and substantially reversible electrochemical behavior within the working electrochemical window of aqueous solutions. Hence, these complexes can allow high open circuit potentials and cell efficiencies to be realized, particularly in combination with the coordinatively saturated titanium (IV) coordination compound as the active material in the first electrolyte solution. In various embodiments, flow batteries of the present disclosure can include the first electrolyte solution in contact with a negative electrode of the flow battery and the second electrolyte solution in contact with the positive electrode of the flow battery.

Illustrative flow battery configurations will now be described in further detail. The flow batteries discussed herein are, in some embodiments, suited to sustained charge or discharge cycles of several hour durations. As such, they can be used to smooth energy supply/demand profiles and provide a mechanism for stabilizing intermittent power generation assets (e.g., from renewable energy sources such as solar and wind energy). It should be appreciated, then, that various embodiments of the present disclosure include energy storage applications where such long charge or discharge durations are desirable. For example, in non-limiting examples, the flow batteries discussed herein can be connected to an electrical grid to allow renewables integration, peak load shifting, grid firming, baseload power generation and consumption, energy arbitrage, transmission and distribution asset deferral, weak grid support, frequency regulation, or any combination thereof. When not connected to an electrical grid, the flow batteries can be used as power sources for remote camps, forward operating bases, off-grid telecommunications, remote sensors, the like, and any combination thereof.

In some embodiments, flow batteries of the present disclosure can include: a first chamber containing a negative electrode contacting a first aqueous electrolyte solution; a second chamber containing a positive electrode contacting a second aqueous electrolyte solution, and a separator disposed between the first and second electrolyte solutions. The first aqueous electrolyte solution can be an aqueous solution containing a coordinatively saturated titanium (IV) coordination compound having catecholate ligands, such as those described above. The chambers provide separate reservoirs within the cell, through which the first and/or second electrolyte solutions circulate so as to contact the respective electrodes and the separator. Each chamber and its associated electrode and electrolyte solution define a corresponding half-cell. The separator provides several functions which include, for example, (1) serving as a barrier to mixing of the first and second electrolyte solutions, (2) electrically insulating to reduce or prevent short circuits between the positive and negative electrodes, and (3) to facilitate ion transport between the positive and negative electrolyte chambers, thereby balancing electron transport during charge and discharge cycles. As described in more detail below, the separator can be an ionomer membrane, and it can have a thickness of less than 100 microns and have an associated net charge that is the same sign as that of the active materials, according to some embodiments. The negative and positive electrodes provide a surface where electrochemical reactions can take place during charge and discharge cycles. During a charge or discharge cycle, electrolyte solutions can be transported from separate storage tanks through the corresponding chambers. In a charging cycle, electrical power can be applied to the cell such that the active material contained in the second electrolyte solution undergoes a one or more electron oxidation and the active material in the first electrolyte solution undergoes a one or more electron reduction. Similarly, in a discharge cycle the second active material is reduced and the first active material is oxidized to generate electrical power.

Figure 1:
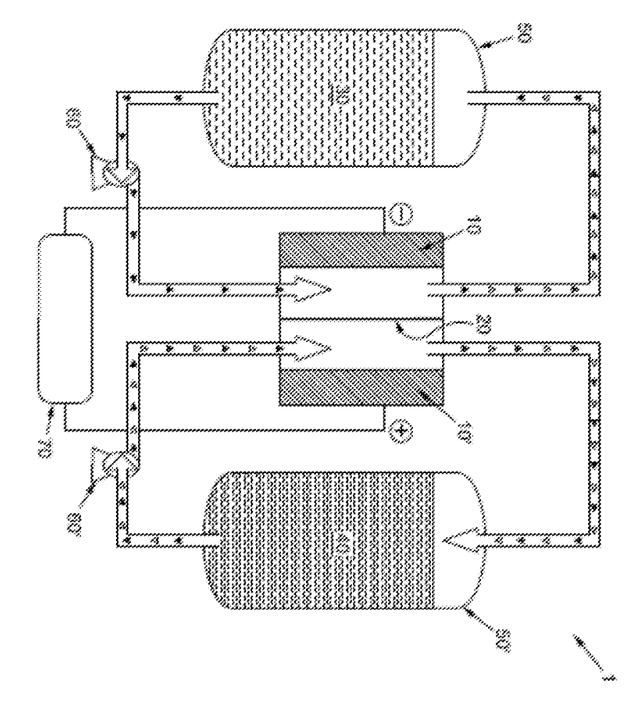
FIG. 1 shows a schematic of an illustrative flow battery.

FIG. 1 depicts a schematic of an illustrative flow battery. Unlike typical battery technologies (e.g., Li-ion, Ni-metal hydride, lead-acid, and the like), where active materials and other components are housed in a single assembly, flow batteries transport (e.g., via pumping) redox-active energy storage materials from storage tanks through an electrochemical stack. This design feature decouples the electrical energy storage system power from the energy storage capacity, thereby allowing for considerable design flexibility and cost optimization.

As shown in FIG. 1, flow battery system 1 includes an electrochemical cell that features separator 20 (e.g., a membrane) that separates the two electrodes 10 and 10' of the electrochemical cell. Electrodes 10 and 10' are formed from a suitably conductive material, such as a metal, carbon, graphite, and the like. Tank 50 contains first active material 30, which is capable of being cycled between an oxidized state and a reduced state.

Pump 60 affects transport of first active material 30 from tank 50 to the electrochemical cell. The flow battery also suitably includes second tank 50' that contains second active material 40. Second active material 40 can be the same material as active material 30, or it can be different. Second pump 60' can affect transport of second active material 40 to the electrochemical cell. Pumps can also be used to affect transport of the active materials from the electrochemical cell back to tanks 50 and 50' (not shown in FIG. 1). Other methods of affecting fluid transport, such as siphons, for example, can also suitably transport first and second active materials 30 and 40 into and out of the electrochemical cell. Also shown in FIG. 1 is power source or load 70, which completes the circuit of the electrochemical cell and allows a user to collect or store electricity during its operation.

It should be understood that FIG. 1 depicts a specific, non-limiting embodiment of a flow battery. Accordingly, flow batteries consistent with the spirit of the present disclosure can differ in various aspects relative to the configuration of FIG. 1. As one example, a flow battery system can include one or more active materials that are solids, gases, and/or gases dissolved in liquids. Active materials can be stored in a tank, in a vessel open to the atmosphere, or simply vented to the atmosphere.

As used herein, the terms "separator" and "membrane" refer synonymously to an ionically conductive and electrically insulating material disposed between the positive and negative electrodes of an electrochemical cell. The separator can be a porous membrane in some embodiments and/or an ionomer membrane in other various embodiments. In some embodiments, the separator can be formed from an ionically conductive polymer.

Polymer membranes can be anion- or cation-conducting electrolytes. Where described as an "ionomer," the term refers to polymer membrane containing both electrically neutral repeating units and ionized repeating units, where the ionized repeating units are pendant and covalently bonded to the polymer backbone. In general, the fraction of ionized units can range from about 1 mole percent to about 90 mole percent. For example, in some embodiments, the content of ionized units is less than about 15 mole percent; and in other embodiments, the ionic content is higher, such as greater than about 80 mole percent. In still other embodiments, the ionic content is defined by an intermediate range, for example, in a range of about 15 to about 80 mole percent. Ionized repeating units in an ionomer can include anionic functional groups such as sulfonate, carboxylate, and the like. These functional groups can be charge balanced by, mono-, di-, or higher-valent cations, such as alkali or alkaline earth metals. Ionomers can also include polymer compositions containing attached or embedded quaternary ammonium, sulfonium, phosphazenium, and guanidinium residues or salts. Suitable examples will be familiar to one having ordinary skill in the art.

In some embodiments, polymers useful as a separator can include highly fluorinated or perfluorinated polymer backbones. Certain polymers useful in the present disclosure can include copolymers of tetrafluoroethylene and one or more fluorinated, acid-functional co-monomers, which are commercially available as NAFION™ perfluorinated polymer electrolytes from DuPont. Other useful perfluorinated polymers can include copolymers of tetrafluoroethylene and $FSO_2$—$CF_2CF_2CF_2CF_2$—O—CF=$CF_2$, FLEMION™ and SELEMION™.

Additionally, substantially non-fluorinated membranes that are modified with sulfonic acid groups (or cation exchanged sulfonate groups) can also be used. Such membranes can include those with substantially aromatic backbones such as, for example, polystyrene, polyphenylene, biphenyl sulfone (BPSH), or thermoplastics such as polyetherketones and polyethersulfones.

Battery-separator style porous membranes can also be used as the separator. Because they contain no inherent ionic conduction capabilities, such membranes are typically impregnated with additives in order to function. These membranes typically contain a mixture of a polymer and inorganic filler, and open porosity. Suitable polymers can include, for example, high density polyethylene, polypropylene, polyvinylidene difluoride (PVDF), or polytetrafluoroethylene (PTFE). Suitable inorganic fillers can include silicon carbide matrix material, titanium dioxide, silicon dioxide, zinc phosphide, and ceria.

Separators can also be formed from polyesters, polyetherketones, poly(vinyl chloride), vinyl polymers, and substituted vinyl polymers. These can be used alone or in combination with any previously described polymer.

Porous separators are non-conductive membranes which allow charge transfer between two electrodes via open channels filled with electrolyte. The permeability increases the probability of chemicals (e.g., active materials) passing through the separator from one electrode to another and causing cross-contamination and/or reduction in cell energy efficiency. The degree of this cross-contamination can depend on, among other features, the size (the effective diameter and channel length), and character (hydrophobicity/hydrophilicity) of the pores, the nature of the electrolyte, and the degree of wetting between the pores and the electrolyte.

The pore size distribution of a porous separator is generally sufficient to substantially prevent the crossover of active materials between the two electrolyte solutions. Suitable porous membranes can have an average pore size distribution of between about 0.001 nm and 20 micrometers, more typically between about 0.001 nm and 100 nm. The size distribution of the pores in the porous membrane can be substantial. In other words, a porous membrane can contain a first plurality of pores with a very small diameter (approximately less than 1 nm) and a second plurality of pores with a very large diameter (approximately greater than 10 micrometers). The larger pore sizes can lead to a higher amount of active material crossover. The ability for a porous membrane to substantially prevent the crossover of active materials can depend on the relative difference in size between the average pore size and the active material. For example, when the active material is a metal center in a coordination compound, the average diameter of the coordination compound can be about 50% greater than the average pore size of the porous membrane. On the other hand, if a porous membrane has substantially uniform pore sizes, the average diameter of the coordination compound can be about 20% larger than the average pore size of the porous membrane. Likewise, the average diameter of a coordination compound is increased when it is further coordinated with at least one water molecule. The diameter of a coordination compound of at least one water molecule is generally considered to be the hydrodynamic diameter. In such embodiments, the hydrodynamic diameter is generally at least about 35% greater than the average pore size. When the average pore size is substantially uniform, the hydrodynamic radius can be about 10% greater than the average pore size.

In some embodiments, the separator can also include reinforcement materials for greater stability. Suitable reinforcement materials can include nylon, cotton, polyesters, crystalline silica, crystalline titania, amorphous silica, amorphous titania, rubber, asbestos, wood or any combination thereof.

Separators within the flow batteries of the present disclosure can have a membrane thickness of less than about 500 micrometers, or less than about 300 micrometers, or less than about 250 micrometers, or less than about 200 micrometers, or less than about 100 micrometers, or less than about 75 micrometers, or less than about 50 micrometers, or less than about 30 micrometers, or less than about 25 micrometers, or less than about 20 micrometers, or less than about 15 micrometers, or less than about 10 micrometers. Suitable separators can include those in which the flow battery is capable of operating with a current efficiency of greater than about 85% with a current density of 100 mA/cm$^2$ when the separator has a thickness of 100 micrometers. In further embodiments, the flow battery is capable of operating at a current efficiency of greater than 99.5% when the separator has a thickness of less than about 50 micrometers, a current efficiency of greater than 99% when the separator has a thickness of less than about 25 micrometers, and a current efficiency of greater than 98% when the separator has a thickness of less than about 10 micrometers. Accordingly, suitable separators include those in which the flow battery is capable of operating at a voltage efficiency of greater than 60% with a current density of 100 mA/cm$^2$. In further embodiments, suitable separators can include those in which the flow battery is capable of operating at a voltage efficiency of greater than 70%, greater than 80% or even greater than 90%.

The diffusion rate of the first and second active materials through the separator can be less than about $1\times10^{-5}$ mol cm$^{-2}$ day$^{-1}$, or less than about $1\times10^{-6}$ mol cm$^{-2}$ day$^{-1}$, or less than about $1\times10^{-7}$ mol cm$^{-2}$ day$^{-1}$, or less than about $1\times10^{-9}$ mol cm$^{-2}$ day$^{-1}$, or less than about $1\times10^{-11}$ mol cm$^{-2}$ day$^{-1}$, or less than about $1\times10^{-13}$ mol cm$^{-2}$ day$^{-1}$, or less than about $1\times10^{-15}$ mol cm$^{-2}$ day$^{-1}$.

The flow batteries can also include an external electrical circuit in electrical communication with the first and second electrodes. The circuit can charge and discharge the flow battery during operation.

Further exemplary embodiments of a flow battery provide that (a) the first active material has an associated net positive or negative charge and is capable of providing an oxidized or reduced form over an electric potential in a range of the negative operating potential of the system, such that the resulting oxidized or reduced form of the first active material has the same charge sign (positive or negative) as the first active material and the ionomer membrane also has a net ionic charge of the same sign, and (b) the second active material has an associated net positive or negative charge and is capable of providing an oxidized or reduced form over an electric potential in a range of the positive operating potential of the system, such that the resulting oxidized or reduced form of the second active material has the same charge sign (positive or negative sign) as the second active material and the ionomer membrane also has a net ionic charge of the same sign; or both (a) and (b). In some embodiments, the net ionic charge in both the oxidized and reduced forms can be negative. The matching charges of the first and/or second active materials and the ionomer membrane can provide a high selectivity. More specifically, charge matching can provide less than about 3%, less than about 2%, less than about 1%, less than about 0.5%, less than about 0.2%, or less than about 0.1% of the molar flux of ions passing through the ionomer membrane as being attributable to the first or second active material. The term "molar flux of ions" will refer to the amount of ions passing through the ionomer membrane, balancing the charge associated with the flow of external electricity/electrons. That is, the flow battery is capable of operating or operates with the substantial exclusion of the active materials by the ionomer membrane, and such exclusion can be promoted through charge matching.

Flow batteries incorporating the electrolyte solutions of the present disclosure can have one or more of the following operating characteristics: (a) where, during the operation of the flow battery, the first or second active materials comprise less than about 3% of the molar flux of ions passing through the ionomer membrane; (b) where the round trip current efficiency is greater than about 70%, greater than about 80%, or greater than about 90%; (c) where the round trip current efficiency is greater than about 90%; (d) where the sign of the net ionic charge of the first, second, or both active materials is the same in both oxidized and reduced forms of the active materials and matches that of the ionomer membrane; (e) where the ionomer membrane has a thickness of less than about 100 µm less than about 75 µm, less than about 50 µm, or less than about 250 µm; (f) where the flow battery is capable of operating at a current density of greater than about 100 mA/cm$^2$ with a round trip voltage efficiency of greater than about 60%; and (g) where the energy density of the electrolyte solutions is greater than about 10 Wh/L, greater than about 20 Wh/L, or greater than about 30 Wh/L.

In some cases, a user may desire to provide higher charge or discharge voltages than available from a single battery cell. In such cases, several battery cells can be connected in series such that the voltage of each cell is additive. This forms a bipolar stack. An electrically conductive, but non-porous material (e.g., a bipolar plate) can be employed to connect adjacent battery cells in a bipolar stack, which allows for electron transport but prevents fluid or gas transport between adjacent cells. The positive electrode compartments and negative electrode compartments of individual cells can be fluidically connected via common positive and negative fluid manifolds in the stack. In this way, individual cells can be stacked in series to yield a voltage appropriate for DC applications or conversion to AC applications.

In additional embodiments, the cells, cell stacks, or batteries can be incorporated into larger energy storage systems, suitably including piping and controls useful for operation of these large units. Piping, control, and other equipment suitable for such systems are known in the art, and can include, for example, piping and pumps in fluid communication with the respective chambers for moving electrolyte solutions into and out of the respective chambers and storage tanks for holding charged and discharged electrolytes. The cells, cell stacks, and batteries of this disclosure can also include an operation management system. The operation management system can be any suitable controller device, such as a computer or microprocessor, and can contain logic circuitry that sets operation of any of the various valves, pumps, circulation loops, and the like.

In more specific embodiments, a flow battery system can include a flow battery (including a cell or cell stack); storage tanks and piping for containing and transporting the electrolyte solutions; control hardware and software (which may include safety systems); and a power conditioning unit. The flow battery cell stack accomplishes the conversion of charging and discharging cycles and determines the peak power. The storage tanks contain the positive and negative active materials, such as the coordination compounds disclosed herein, and the tank volume determines the quantity of energy stored in the system. The control software, hardware, and optional safety systems suitably include sensors, mitigation equipment and other electronic/hardware controls and safeguards to ensure safe, autonomous, and efficient operation of the flow battery system. A power conditioning unit can be used at the front end of the energy storage system to convert incoming and outgoing power to a voltage and current that is optimal for the energy storage system or the application. For the example of an energy storage system connected to an electrical grid, in a charging cycle the power conditioning unit can convert incoming AC electricity into DC electricity at an appropriate voltage and current for the cell stack. In a discharging cycle, the stack produces DC electrical power and the power conditioning unit converts it to AC electrical power at the appropriate voltage and frequency for grid applications.

Accordingly, methods for forming a flow battery in accordance with the present disclosure can, in some embodiments, include: combining titanium tetrachloride and a catechol compound in an aprotic solvent to form a reaction mixture; reacting the titanium tetrachloride with the catechol compound in an absence of base to form a coordinatively unsaturated titanium (IV) coordination compound having a coordination number of 5 or less and containing two catecholate ligands, the coordinatively unsaturated titanium (IV) coordination compound being insoluble in the reaction mixture; isolating the coordinatively unsaturated titanium (IV) coordination compound from the reaction mixture as a solid; combining the coordinatively unsaturated titanium (IV) coordination compound, a ligatable compound, and an alkali metal base in an aqueous solvent; reacting the coordinatively unsaturated titanium (IV) coordination compound with the ligatable compound to form a coordinatively saturated titanium (IV) coordination compound having four coordination sites occupied by the two catecholate ligands and two coordination sites occupied by one or more additional ligands, the coordinatively saturated titanium (IV) coordination compound being soluble in the aqueous solvent; and incorporating an electrolyte solution containing the coordinatively saturated titanium (IV) coordination compound in at least one half-cell of a flow battery.

In some embodiments, the coordinatively unsaturated titanium (IV) coordination compound can be formed at a site remote from the flow battery, and formation of the coordinatively saturated titanium (IV) coordination compound in an aqueous solution can take place at a location where the flow battery is deployed.

Where not otherwise defined hereinabove or understood by one having ordinary skill in the art, the definitions in the following paragraphs will be applicable to the present disclosure.

As used herein, the term "energy density" refers to the amount of energy that can be stored, per unit volume, in the active materials. Energy density refers to the theoretical energy density of energy storage and can be calculated by Equation 1:

$$\text{Energy density} = (26.8 \text{ A-h/mol}) \times OCV \times [e^-] \quad (1)$$

where OCV is the open circuit potential at 50% state of charge, (26.8 A-h/mol) is Faraday's constant, and $[e^-]$ is the concentration of electrons stored in the active material at 99% state of charge. In the case that the active materials largely are an atomic or molecular species for both the positive and negative electrolyte, $[e^-]$ can be calculated by Equation 2 as:

$$[e^-] = [\text{active materials}] \times N/2 \quad (2)$$

where [active materials] is the molar concentration of the active material in either the negative or positive electrolyte, whichever is lower, and N is the number of electrons transferred per molecule of active material. The related term "charge density" refers to the total amount of charge that each electrolyte contains. For a given electrolyte, the charge density can be calculated by Equation 3

$$\text{Charge density} = (26.8 \text{ A-h/mol}) \times [\text{active material}] \times N \quad (3)$$

where [active material] and N are as defined above.

As used herein, the term "current density" refers to the total current passed in an electrochemical cell divided by the geometric area of the electrodes of the cell and is commonly reported in units of mA-cm$^2$.

As used herein, the term "current efficiency" ($I_{eff}$) can be described as the ratio of the total charge produced upon discharge of a cell to the total charge passed during charging. The current efficiency can be a function of the state of charge of the flow battery. In some non-limiting embodiments, the current efficiency can be evaluated over a state of charge range of about 35% to about 60%.

As used herein, the term "voltage efficiency" can be described as the ratio of the observed electrode potential, at a given current density, to the half-cell potential for that electrode (×100%). Voltage efficiencies can be described for a battery charging step, a discharging step, or a "round trip voltage efficiency." The round trip voltage efficiency ($V_{eff,rt}$)

at a given current density can be calculated from the cell voltage at discharge ($V_{discharge}$) and the voltage at charge ($V_{charge}$) using equation 4:

$$V_{eff,RT} = V_{discharge}/V_{charge} \times 100\% \quad (4)$$

As used herein, the terms "negative electrode" and "positive electrode" are electrodes defined with respect to one another, such that the negative electrode operates or is designed or intended to operate at a potential more negative than the positive electrode (and vice versa), independent of the actual potentials at which they operate, in both charging and discharging cycles. The negative electrode may or may not actually operate or be designed or intended to operate at a negative potential relative to a reversible hydrogen electrode. The negative electrode is associated with a first electrolyte solution and the positive electrode is associated with a second electrolyte solution, as described herein. The electrolyte solutions associated with the negative and positive electrodes may be described as negolytes and posolytes, respectively.

Although the disclosure has been described with reference to the disclosed embodiments, those skilled in the art will readily appreciate that these are only illustrative of the disclosure. It should be understood that various modifications can be made without departing from the spirit of the disclosure. The disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description.

What is claimed is the following:

1. A method comprising:
    reacting a titanium tetrachloride with a catechol compound in an aprotic solvent and an absence of base to form a coordinatively unsaturated titanium (IV) coordination compound having a coordination number of 5 or less and comprising two catecholate ligands;
    wherein the coordinatively unsaturated titanium (IV) coordination compound is insoluble in the aprotic solvent; and
    reacting the coordinatively unsaturated titanium (IV) coordination compound with a ligatable compound in the presence of a base and a second solvent to form a coordinatively saturated titanium (IV) coordination compound having four coordination sites occupied by the two catecholate ligands and two coordination sites occupied by one or more additional ligands.

2. The method of claim 1, wherein the coordinatively unsaturated titanium (IV) coordination compound has a coordination number of 4.

3. The method of claim 2, wherein the coordinatively unsaturated titanium (IV) coordination compound is electrically neutral and bears no counterions.

4. The method of claim 1, comprising no more than about 2 stoichiometric equivalents of the catechol compound relative to the titanium tetrachloride.

5. The method of claim 1, further comprising:
    isolating the insoluble coordinatively unsaturated titanium (IV) coordination compound as a solid and reacting the isolated solid with the ligatable compound in the presence of the base and the second solvent to form the coordinatively saturated titanium (IV) coordination compound having four coordination sites occupied by the two catecholate ligands and two coordination sites occupied by the one or more additional ligands.

6. The method of claim 5, wherein the insoluble coordinatively unsaturated titanium (IV) coordination compound is substantially free of non-ligated catechol compound.

7. The method of claim 5, further comprising:
    rinsing the insoluble coordinatively unsaturated titanium (IV) coordination compound with a washing solvent after isolating.

8. The method of claim 1, wherein the second solvent comprises an aqueous solvent.

9. The method of claim 8, wherein the coordinatively saturated titanium (IV) coordination compound is soluble in the aqueous solvent.

10. The method of claim 1, wherein the one or more additional ligands comprise an additional catecholate ligand that is the same as or different than the two catecholate ligands.

11. The method of claim 1, wherein the base comprises one or more alkali metal base, an ammonium base, or a combination thereof.

12. The method of claim 1, wherein the coordinatively insoluble unsaturated titanium (IV) coordination compound is substantially free of non-ligated catechol compound.

13. The method of claim 5, wherein the solvent comprises an aqueous solvent.

14. The method of claim 13, wherein the coordinatively saturated titanium (IV) coordination compound is soluble in the aqueous solvent.

15. The method of claim 5, wherein the one or more additional ligands comprise an additional catecholate ligand that is the same as or different than the two catecholate ligands.

16. The method of claim 5, wherein the base comprises one or more alkali metal base, an ammonium base, or a combination thereof.

17. A method comprising:
    reacting a titanium tetrachloride with a catechol compound in an aprotic solvent and an absence of base to form a coordinatively unsaturated titanium (IV) coordination compound having a coordination number of 5 or less and comprising two catecholate ligands, wherein the coordinatively unsaturated titanium (IV) coordination compound is insoluble;
    isolating the coordinatively unsaturated titanium (IV) coordination compound as a solid;
    reacting the coordinatively unsaturated titanium (IV) coordination compound with a ligatable compound in the presence of an alkali metal base and aqueous solvent to form a coordinatively saturated titanium (IV) coordination compound having four coordination sites occupied by the two catecholate ligands and two coordination sites occupied by one or more additional ligands, wherein the coordinatively saturated titanium (IV) coordination compound is soluble in the aqueous solvent; and
    incorporating an electrolyte solution comprising the coordinatively saturated titanium (IV) coordination compound in at least one half-cell of a flow battery.

18. The method of claim 17, wherein the one or more additional ligands comprise an additional catecholate ligand that is the same as or different than the two catecholate ligands.

* * * * *